Nov. 1, 1966
J. E. LAJZA
3,282,092
HYDRAULIC NOZZLE TESTER
Filed Jan. 2, 1964
2 Sheets-Sheet 2
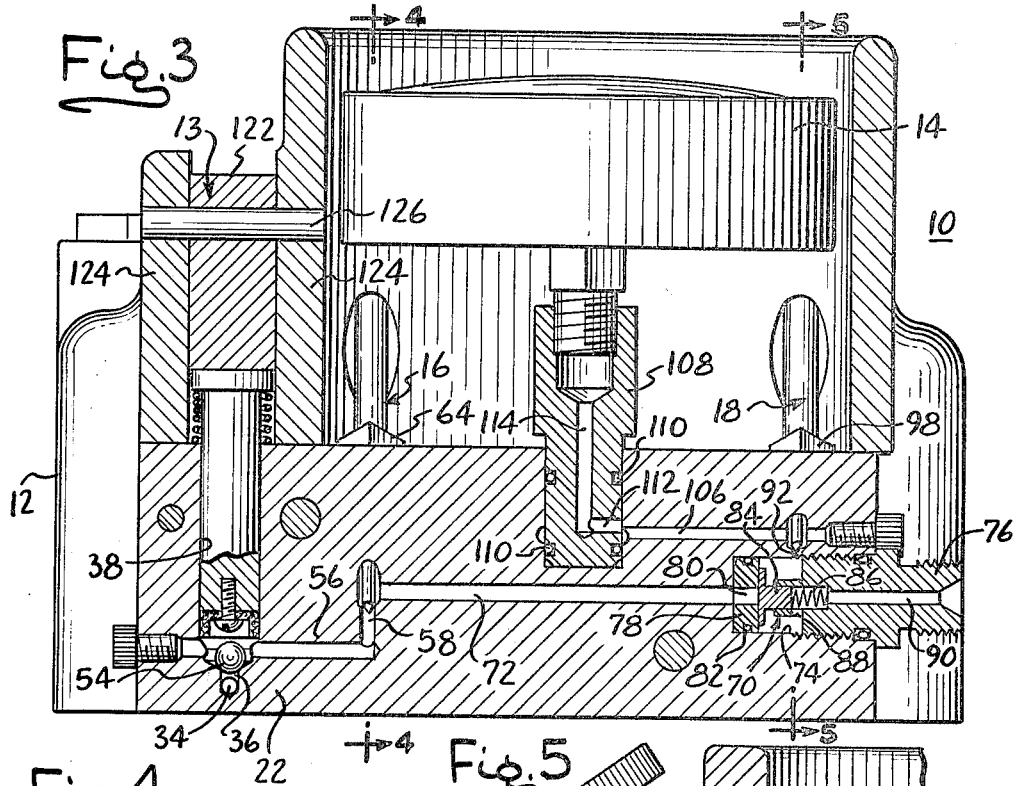
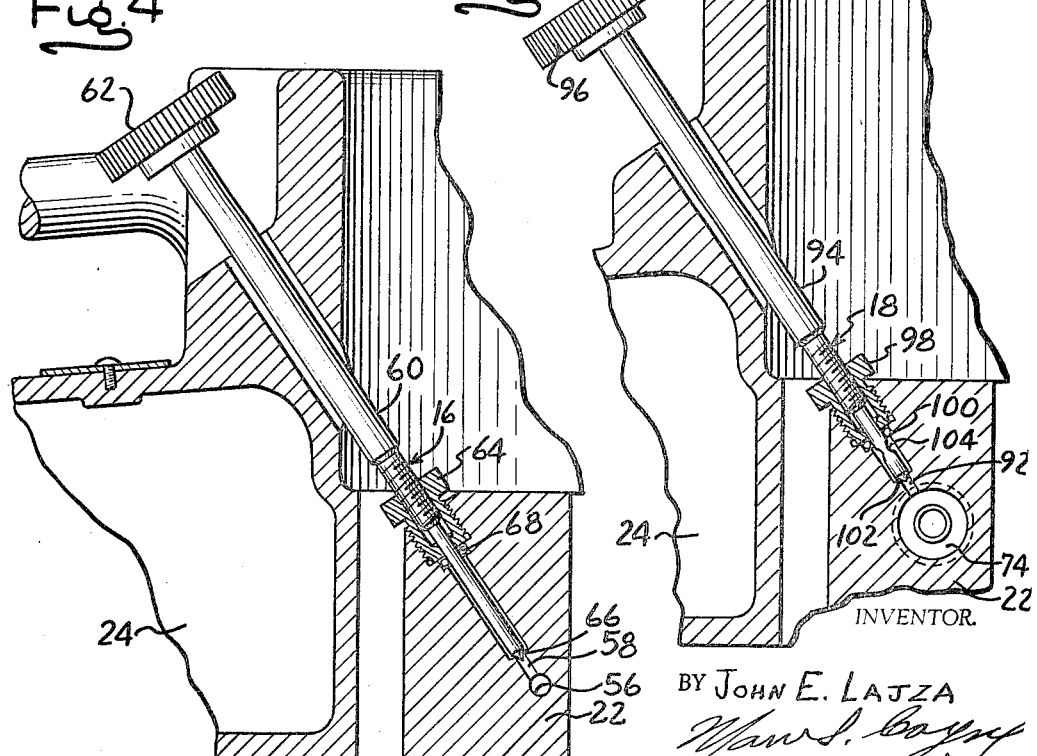
INVENTOR.
BY JOHN E. LAJZA
ATTY

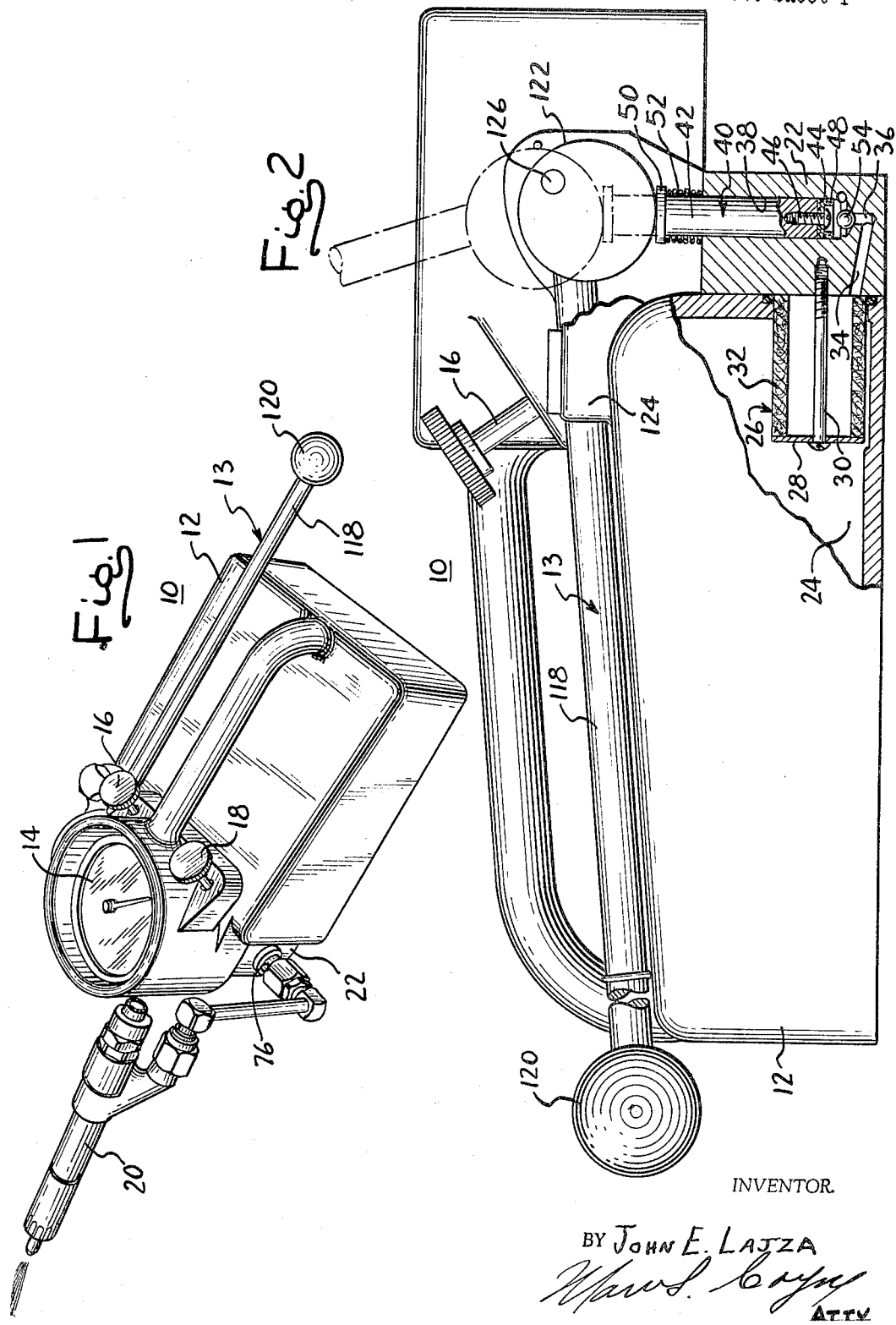

United States Patent Office 3,282,092
Patented Nov. 1, 1966

3,282,092
HYDRAULIC NOZZLE TESTER
John E. Lajza, Hickory Hills, Ill., assignor to Kiene Diesel Accessories, Inc., Franklin Park, Ill., a corporation of Illinois
Filed Jan. 2, 1964, Ser. No. 335,205
2 Claims. (Cl. 73—119)

This invention relates to a hydraulic testing device and in particular to an improved hydraulic testing device for testing the nozzles of diesel engines and the like.

Various types of nozzle testers have been developed and used and which were usually cumbersome and if capable of developing high pressures were operated by a relatively long handle which made them awkward to use. Also, the use of a relatively long handle necessitated the use of a long base which greatly reduced the effective portability of the hydraulic testing device.

Accordingly, it is the general object of this invention to provide a hydraulic testing device that is portable and compact and which can develop greater pressures than any hydraulic testing device of comparable size.

It is another object of this invention to provide a hydraulic testing device that is portable and which is provided with a pump handle arranged so as to be capable of creating a high hydraulic pressure without having associated therewith a correspondingly long base structure.

It is another object of this invention to provide a hydraulic testing device permitting the pump handle to be longer than the tester base and providing the necessary mechanical advantage and stability for high performance while being capable of being operated portably.

Briefly, in a preferred embodiment of the invention, a hydraulic testing device is provided that comprises a fluid reservoir and a pump mechanism. The fluid is extracted from the reservoir and is drawn into a holding chamber on the upswing of the pump handle. On the downswing of the pump handle movement a large force is exerted on the fluid and the fluid is expelled from the pump mechanism at a high pressure. The handle structure is arranged so that a longer lever arm can be utilized with the present hydraulic testing device than was ever possible before without tying the base of the hydraulic testing device to the floor, for example, or without increasing the overall length of the base of the hydraulic testing device. Positioned in the hydraulic testing device is a pump valve, a pressure gauge and a gauge valve. The pump valve is capable of isolating the pump from the tested nozzle or the like thereby enabling pumped fluid to be maintained at the nozzle under high pressure to run a time test for nozzle leakage, for example. Also the pressure gauge can be isolated from the pumped fluid by manipulation of the gauge valve. The gauge valve is provided with bleeder means to enable any trapped pressure to bleed down.

Other features, objects and advantages of this invention will become more apparent if the following drawings are viewed in light of the specification and of which:

FIG. 1 is a perspective view of a hydraulic testing device illustrating the preferred embodiment of the invention;

FIG. 2 is a partially cutaway side-elevational view of the embodiment of the invention illustrated in FIG. 1;

FIG. 3 is a vertical sectional view through the pump block and illustrating the relationship of parts therein;

FIG. 4 is a view taken along the lines 4—4 in FIG. 3;

FIG. 5 is a view taken along the line 5—5 in FIG. 3.

Referring to the drawings, there is illustrated a hydraulic testing device generally indicated as 10 and comprising a pump housing 12, a pressure gauge 14, a pump valve assembly 16, a gauge valve assembly 18, a pump handle assembly 13 and a pressure discharge assembly 20.

The pump housing 12 comprises a pump block 22 in which the various passages associated with the pump handle assembly 13, the pressure gauge 14, the pump valve assembly 16, the gauge valve assembly 18, and the pump reservoir 24 are positioned.

Positioned within the pump reservoir 24 is a fluid filter assembly 26. The fluid filter assembly 26 is secured in position and to the pump block 22 by means of a washer 28 and a machine screw 30. The fluid filter 32 of the fluid filter assembly 26 is cylindrical in configuration and prevents dirt particles from entering the pump block 22. A first horizontal inlet passage 34 and a first vertical inlet passage 36 are provided in pump block 22 to transmit fluid from the pump reservoir 24 to the fluid holding chamber 38. Positioned in the fluid holding chamber 38 is a piston assembly 40, as best illustrated in FIG. 2. The piston assembly 40 comprises a piston 42, a Teflon piston seal 44 secured to the piston 42 by a machine screw 46 positioned in a recess 48 in the Teflon piston seal 44. Positioned below the piston head 50 of the piston 42 and intermediate the piston head 50 and the top of the pump block 22 is a spring 52 that normally biases the piston 42 in an upward direction. Also positioned in the fluid holding chamber 38 is a ball valve 54 and the ball valve 54 when sitting on top of the first vertical inlet passage 36 blocks flow of the fluid from the fluid holding chamber 38 to the fluid reservoir 24.

Leading from the fluid holding chamber 38 to the pump valve assembly 16 are a pair of passages, a horizontal pump valve passage 56 and a vertical pump valve passage 58.

The pump valve assembly 16 is best illustrated in FIG. 4 and comprises a valve body 60 having a valve knob 62 formed on the upper end thereof, a gland nut 64 threadably secured to the pump block 22 and rigidly secured to the valve body 60 and a tapered valve seat element 66 formed on the valve body 60, all as illustrated in FIG. 4. Also included therein is an O-ring 68 positioned below the gland nut 64. Rotation of the valve knob 62 and consequently the valve body 60 and the gland nut 64 rotates the pump valve assembly 16 and moves the tapered valve seat element 66 out of a seating relationship with the vertical pump valve passage 58 to permit the fluid to flow therepast.

Positioned in the pump block 22 and interconnecting the vertical pump valve passage 58 and the valve discharge assembly 70 is a horizontal valve discharge passage 72 as best seen in FIG. 3. The valve discharge assembly 70 is positioned in a partially threaded outlet passage 74 and includes a discharge connector 76 threadably engaged in the partially threaded outward passage 74. The discharge connector 76 has threads formed thereon at the outer edge thereof and can be connected to a pressure discharge assembly 20 shown in FIG. 1 which assembly can be of any type known in the art. A valve seat element 78 having a valve seat aperture 80 formed therein and extending therethrough is positioned in the outlet passage 74 as illustrated in FIG. 3. Positioned in a groove in the valve seat 78 is an O-ring 82. Positioned in the partially threaded outlet passage 74 and partially within the discharge connector 76 is a valve element 84. The valve element 84 is spring-biased up against the valve seat 78 by means of a spring 86 positioned within the discharge connector 76, as best illustrated in FIG. 3. A discharge connector inlet aperture 88 is provided in the discharge connector 76 to permit fluid to pass into the outlet passage 90 of the discharge connector 76 and then to any pressure discharge assembly such as 20 illustrated in FIG. 1.

Leading from the partially threaded outlet passage 74 is a first vertical gauge valve passage 92, as can be seen in FIGS. 3 and 5. The first vertical gauge valve passage 92 leads to the gauge valve assembly 18. The gauge valve assembly 18 comprises a gauge valve body 94, a gauge valve knob 96, positioned on said gauge valve body 94, a second gland nut 98 threadedly engaged in the pump block 22 and rigidly secured to the gauge valve body 94, O-ring 100, a tapered gauge valve seat element 102 formed on one end of the gauge valve body 94 and a reduced diameter portion 104 formed in the gauge valve body 94, all as best seen in FIG. 5.

Leading from the gauge valve assembly 18 and in communication with the first vertical gauge valve passage 92 is a first horizontal gauge passage 106. Positioned in the pump block 22 is a gauge adapter 108. The gauge adapter 108 is provided with a pair of O-rings 110 and a second horizontal gauge passage 112. Also positioned in the gauge adapter 108 is a second vertical gauge passage 114 leading up to the pressure gauge 14.

Referring to FIGS. 2 and 3, there is illustrated the pump handle assembly 13 which comprises a pump handle 118 and a gripping knob 120 positioned at the end of the pump handle 118 and secured thereto by any known means. A pump handle cam 122 is eccentrically pivoted within pump handle mounting brackets 124 integrally formed on the pump housing 12. The pump handle cam 122 is secured to pump handle mounting brackets 124 by means of the rod 126.

Operation

Initially, the pump reservoir 24 is filled through any convenient aperture with a fluid, such as oil for example. Assuming that the pump handle assembly 13 is initially in a position shown in solid lines in FIG. 2, the pump handle 118 and the pump handle cam 122 are then pivoted upwardly by the operator and to a position as shown in dotted lines in FIG. 2. As the pump handle 118 and the pump handle cam 122 pivot in an upward direction, the piston 42 moves in an upward direction under the driving force of the spring 52, as can be clearly seen in FIG. 2 and which is illustrated in dotted lines in FIG. 2. When the piston 42 moves up in the fluid holding chamber 38, a partial vacuum is created and fluid is drawn from the fluid reservoir 24 through the fluid filter 32, the first horizontal inlet passage 34, the first vertical inlet passage 36, up around the ball valve 54, which is moved out of its seating relationship in the first vertical inlet passage 36 by the partial vacuum and up into the fluid holding chamber 38. The partial vacuum that is formed in the fluid holding chamber 38 also exerts a force through the horizontal pump valve passage 56, the vertical pump valve passage 58 and the horizontal valve discharge passage 72, and onto the valve seat 78. This partial vacuum causes a differential in pressure on the valve seat 78 with the pressure being larger on the side of the valve seat 78 on which the valve element 84 is positioned and the valve seat 78 is drawn to the left, as viewed in FIG. 3 by the partial vacuum. The valve element 84 is pushed up against the valve seat 78 by spring 86.

When the pump handle 18 is in its uppermost position as illustrated in dotted lines in FIG. 2, the pump portion of the cycle begins and as the pump handle 118 and the pump handle cam 122 are pivoted downwardly the pump handle cam 122 exerts a pressure on the piston 42 and specifically on the piston head 50 of the piston 42 and the piston 42 is moved in a downward direction. Pressure is thereby exerted on the fluid in the fluid holding chamber 38 and consequently on the ball valve 54 to secure the ball valve 54 in a seating position with relation to the first vertical inlet passage 36 and prevent any fluid from passing into the first vertical inlet passage 36. The fluid under pressure then moves through the horizontal pump valve passage 56 up through the vertical pump valve passage 58, through the pump valve which we have assumed to be open in this situation, and then through the horizontal valve discharge passage 72, through the valve seat aperture 80, and up against the valve element 84. The pressure on the valve element 84 causes the valve element 84 to move against its biasing spring 86 and to move away from contact with the valve seat aperture 80 to permit fluid to flow into the partially threaded output passage 74. Fluid then travels through the discharge connecter inlet aperture 88, into the outlet passage 90 to be delivered to the pressure discharge assembly 20, illustrated in FIG. 1.

The valve seat 78 has no mechanical means for holding it in place. It is held in place by the pressure differential system. As soon as the valve 84 opens or moves to the right, as viewed in FIG. 3, pressure is exerted on the right side of the valve seat 78 by the admitted fluid. The fluid also exerts a force on the right side of the head of the valve 84. However, the valve seat 78 has a greater area than the valve element 84. Consequently, when pressure fluid passes the valve 84, the valve 84 moves while the valve seat 78 remains in place.

Referring to FIG. 5, and assuming that the gauge valve assembly 18 is in its open position, that is the tapered gauge valve seat element 102, is not seated in the upper portion of the first vertical gauge passage 92, fluid will then flow from the partially threaded outlet passage 74 into the first vertical gauge passage 92, through the first horizontal gauge passage 106 and then through the second horizontal gauge passage 112, through the second vertical gauge passage 114, and into the pressure gauge 14, where the pressure of the fluid being pumped is visually indicated on the face of the pressure gauge 14.

If it is desired to shut off the pump as when testing a nozzle or the like for leaks it may be accomplished by turning the pump valve knob 62 so as to turn the rigidly connected gland nut 64 in its threads in pump block 22. This will cause the tapered valve seat element 66 of the pump valve body 60 to seat into the upper end of the vertical pump valve passage 58 to prevent fluid flow in either direction through the vertical pump valve passage 58. The pump valve assembly 16 is opened by simply rotating the pump valve knob 62 in an opposite direction to the direction in which it was rotated to close the pump valve assembly 16.

When it is desired to test a nozzle with a pulsating stream of fluid it is best to isolate the pressure gauge from the stream because the pulsations shorten the life of the pressure gauge. To shut off the gauge valve assembly 18 the gauge valve knob 96 is rotated thus rotating the gauge valve body 94 and the rigidly attached second gland nut 98 causing the gland nut 98 to rotate in its threads in pump block 22 to thereby cause the tapered gauge valve seat element 102 to be seated in the top of the first vertical gauge valve passage 92 to prevent fluid flow in either direction through the first vertical gauge valve passage 92. The gauge valve assembly 18 is opened by simply rotating the gauge valve knob 96 in an opposite direction to the direction in which it was rotated to close the gauge valve assembly 18.

The reduced diameter portion 104 permits fluid at a high pressure in the pressure gauge 14 to leak through the O-ring 100 and thence through the threads in the gland nut 98 and the pump block 22.

The pump handle assembly 13 comprising the pump handle 118 and the pump handle cam 122 enables fluid to be pumped from the hydraulic testing device 10 at a higher pressure than could normally be maintained. It has been found in the past that when the pump handle is made long the entire hydraulic testing device pivots about its bottom edge closest to the operator. This has been well recognized in the art and attempts have been made to avoid this problem including tying the hydraulic testing device down by straps or the like or by making the pump housing longer. Both of these solutions reduce the versatility of use of the hydraulic testing device and effectively reduce the portability of the device.

The combination of the pump handle 118 and the pump handle cam 122, eccentrically pivoted as illustrated in the drawings, when moved downwardly exerts a downward force on the piston head 50 and also exerts a force on the hydraulic testing device that resists pivoting of the hydraulic testing device about its bottom edge closest to the operator. This last mentioned component of force made possible by the pump handle 118 and pump handle cam 122 combination enables a longer pump handle 118 to be used than would be possible if the cam was not used and an ordinary handle assembly was utilized.

Therefore a greater force can be exerted on the piston head 50 than is possible in the present hydraulic testing devices of the same size.

It is to be understood that the specific embodiment disclosed above and in the drawings is merely illustrative of one of the many forms which the invention may take in practice and that numerous modifications thereof will readily occur to those skilled in the art without departing from the scope of the invention. The latter is defined in the appended claims which are to be construed as broadly as permitted by the prior art.

I claim:
1. A portable hydraulic testing device comprising:
   a hollow body member having an enclosed fluid reservoir therein,
   a pump block secured to said body member at one end thereof,
   a pump including a cylinder and a reciprocable piston positioned in said pump block,
   intake passageway means in said pump block connecting the intake end of said cylinder with said fluid reservoir,
   spring means normally urging said piston out of said cylinder and away from the intake end thereof,
   a one-way valve in said cylinder intake end openable upon outward movement of said piston to permit fluid to flow into said cylinder,
   a discharge port in said pump block,
   second passageway means connecting said discharge port with said cylinder and adapted to accommodate fluid pumped therefrom,
   a first manual valve in said pump block and operable to prevent fluid flow through said second passageway means,
   a pressure gauge mounted on said pump block,
   third passageway means connecting said pressure gauge with said second passageway means,
   a second manual valve in said pump block and operable to prevent fluid flow through said third passageway means,
   a disc-like cam pivotally mounted on said pump block for rotation about an eccentric axis,
   said cam being positioned in alignment with said piston so that the peripheral surface of said cam is in constant engagement with the projecting end of said piston, and
   an elongated handle rigidly connected to said cam and projecting away from said pump block and extending beyond the opposite end of said body member,
   said handle being operable in one direction to rotate said cam permitting said spring means to urge said piston outwardly whereupon fluid from said reservoir is drawn into said cylinder,
   said handle being further operable in the opposite direction to urge said piston into said cylinder to pump the fluid from said cylinder.

2. The portable hydraulic testing device of claim 1 and further comprising:
   a one-way discharge valve in said second passageway means and normally closed to prevent reverse fluid flow from said discharge into said second passageway means,
   said discharge valve being openable in response to the pumping of fluid from said cylinder to permit passage of such fluid into said discharge port.

References Cited by the Examiner

UNITED STATES PATENTS

| | | | |
|---|---|---|---|
| 129,273 | 7/1872 | Feeman | 83—628 |
| 345,636 | 7/1886 | Hunter | 83—628 |
| 939,958 | 11/1909 | Koelsch | 83—628 |
| 1,563,226 | 11/1925 | Reed | 222—340 |
| 2,096,574 | 10/1937 | Denny | 60—52 |
| 2,277,256 | 3/1942 | Pfauser | 60—52 |
| 2,490,284 | 12/1949 | Simart | 60—52 |
| 2,517,766 | 8/1950 | Cole | 73—119 |
| 2,744,407 | 5/1956 | Kruger | 73—119 |
| 3,117,444 | 1/1964 | Taylor | 73—119 |

FOREIGN PATENTS 346,889   3/1937   Italy.

LAURENCE V. EFNER, *Primary Examiner.*